(12) United States Patent
Chappuis et al.

(10) Patent No.: US 9,589,246 B2
(45) Date of Patent: Mar. 7, 2017

(54) MARKING THE SURFACE OF METAL COILS WITH MATERIAL PROPERTY DATA

(71) Applicant: FORD GLOBAL TECHNOLOGIES, LLC, Dearborn, MI (US)

(72) Inventors: Laurent Bernard Chappuis, Grosse Ile, MI (US); Ronald Russo, Chelsea, MI (US); George Stanczuk, Amherstburg (CA)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 14/315,404

(22) Filed: Jun. 26, 2014

(65) Prior Publication Data

US 2015/0379458 A1 Dec. 31, 2015

(51) Int. Cl.
*G06F 17/00* (2006.01)
*G06Q 10/08* (2012.01)

(52) U.S. Cl.
CPC .................................. *G06Q 10/08* (2013.01)

(58) Field of Classification Search
CPC .. B21B 2003/001; B21B 38/00; G01N 19/08; G01N 21/88; G01N 21/8851; G01N 2021/8854; G01N 2021/8864; G01N 2021/888; G01N 2021/8918; G01N 21/892
USPC .................................................. 235/375, 376
See application file for complete search history.

(56) References Cited

U.S. PATENT DOCUMENTS

| | | | | |
|---|---|---|---|---|
| 2,896,196 A * | 7/1959 | Hartford | ................. | G01N 27/20 118/670 |
| 4,126,491 A * | 11/1978 | Karlsson | ............. | G01N 27/9093 148/195 |
| 4,204,012 A * | 5/1980 | Brocklehurst | ........... | D06H 1/00 118/42 |
| 4,590,654 A * | 5/1986 | Kajiura | .................. | B62D 65/00 118/315 |
| 4,629,319 A * | 12/1986 | Clarke | .................... | G01N 21/88 356/237.2 |
| 4,764,667 A * | 8/1988 | Abe | ........................ | B23Q 41/00 235/487 |
| 4,817,424 A * | 4/1989 | Pellatiro | ................. | G01N 21/89 413/69 |

(Continued)

FOREIGN PATENT DOCUMENTS

WO 2012/085849 A2 6/2012

*Primary Examiner* — Paultep Savusdiphol
(74) *Attorney, Agent, or Firm* — Raymond L. Coppiellie; Brooks Kushman P.C.

(57) ABSTRACT

A marking system for a rolled metal coil to provide markings containing data about material properties within the metal proximate the markings. The material property data may be used for allocating blanks from the coil for different vehicle body stampings. A monitoring device may be configured to provide material property data of metal during formation of a coil. A marking device may be configured to provide a 2D-matrix as the marking on a surface of the coil. A controller may be programmed to, in response to receiving the data, utilize the marking device to provide the 2D-matrix containing the material property data on the coil proximate a location of the material property. The 2D-matrix may also allow for the traceability of a finished part back to the coil it was blanked and subsequently formed from.

20 Claims, 2 Drawing Sheets

(56) References Cited

U.S. PATENT DOCUMENTS

| | | | | | |
|---|---|---|---|---|---|
| 4,837,904 | A * | 6/1989 | Abe | | B23Q 41/00 235/487 |
| 4,865,872 | A * | 9/1989 | Pellatiro | | G01N 21/89 101/484 |
| 4,920,385 | A * | 4/1990 | Clarke | | G01N 21/88 356/237.2 |
| 5,081,923 | A * | 1/1992 | LaMantia | | B65H 23/1886 101/23 |
| 5,231,675 | A * | 7/1993 | Sarr | | G01N 21/88 348/125 |
| 5,937,748 | A * | 8/1999 | Leligdon | | B41F 13/025 101/248 |
| 5,944,923 | A * | 8/1999 | Hayashi | | C22C 21/02 148/246 |
| 6,110,297 | A * | 8/2000 | Hayashi | | C22C 21/00 148/246 |
| 6,725,123 | B1 * | 4/2004 | Denuell | | G01N 21/89 101/219 |
| 7,248,366 | B2 * | 7/2007 | Uesugi | | G01N 21/89 356/237.2 |
| 7,846,277 | B2 * | 12/2010 | Kehl | | B21B 3/00 148/696 |
| 8,740,061 | B2 * | 6/2014 | Fisher | | G05B 19/41875 235/375 |
| 2006/0203229 | A1 * | 9/2006 | Gotoh | | G01N 21/952 356/237.1 |
| 2009/0030544 | A1 * | 1/2009 | Floeder | | G01N 21/8851 700/122 |
| 2013/0173508 | A1 * | 7/2013 | Anayama | | G01N 21/892 706/12 |
| 2013/0322734 | A1 * | 12/2013 | Richter | | G06T 7/0004 382/141 |
| 2014/0008426 | A1 * | 1/2014 | Fisher | | G05B 19/41875 235/375 |
| 2014/0090455 | A1 * | 4/2014 | Valencia | | G01B 5/28 73/104 |

* cited by examiner

MARKING THE SURFACE OF METAL COILS WITH MATERIAL PROPERTY DATA

TECHNICAL FIELD

This disclosure relates to the marking of a surface of a metal coil with material property data proximate the location of the material property, and more specifically to the monitoring of an aluminum alloy during a rolling of a coil and marking the surface of the coil with the material property data along a longitudinal edge of the coil transverse to the location of the material property or within a predetermined interval.

BACKGROUND

Pickup trucks are motor vehicles with a front passenger area, often referred to as a cab, and an open top rear cargo area, often referred to as a box. The box typically has a substantially flat bed from which two sidewalls and a forward interconnecting headboard extend upwardly therefrom. Pickup trucks may also employ a bottom hinged door, commonly referred to as a tailgate, hinged at the rear edge of the bed and closable to provide a fourth wall for the cargo area. Cabs and boxes may be complete separate assemblies from each other and a frame, part of a single body structure separate from a frame, or part of the same unibody structure. Pickup trucks are popular largely because the box allows them to be utilized in so many different ways, including carrying a variety of types of cargo and towing various types of trailers.

Traditionally the majority of body structures on pickup trucks have been formed from steel alloys. Through years of experience, pickup truck designers have learned how to engineer steel truck body parts that withstand the variety of demanding pickup truck applications. The current regulatory and economic environments have increased the importance of making pickup trucks more fuel efficient as well as functional and durable. One way to reduce the fuel consumption of a vehicle is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. As well, fabrication techniques and methods of joining parts that work well for steel parts may not work well for the same aluminum part. In addition, the material properties of the aluminum even in a specific grade or on the same roll may not be suitable for all vehicle components on the pickup truck. Due to these and other differences, simple material substitution does not necessarily produce an acceptable design.

Aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying element in 6xxx or 6000 series aluminium alloy is magnesium and silicon, while the major alloying element of 5xxx or 5000 series is magnesium and for 7xxx or 7000 series is zinc. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties. The percentage of alloying elements may change as a coil is rolled.

In addition, five basic temper designations may be used for aluminum alloys which are: F—as fabricated, O—annealed, H—strain hardened, T—thermally treated, and W—as quenched. The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

SUMMARY

One aspect of this disclosure is directed to a method of allocating aluminum blanks cut from a coil having optically detectable markings. The method has the steps of reading at least one marking on a blank, decoding data encoded in the marking, and allocating the blank, in response to the decoded data, for production of a plurality of vehicle components. The markings may contain data relating to material properties originating from within a region of the coil proximate the marking.

The method may further include the steps of providing a predefined data map having at least one material property limit and allocating the blank based on the material property limit. The blank may be allocated as a first vehicle component in response to the decoded data containing material property data below the material property limit. Conversely, the blank may be allocated as a second vehicle component in response to the decoded data containing material property data being above the material property limit.

The material property may be a non-visible-to-the-naked-eye surface defect located within the region of the coil proximate the marking. The material property limit may be an occurrence of any surface defects located within the blank. The first vehicle component may be a structural body component. The second vehicle component may be a non-structural body panel component. Thus, the material property data would indicate a surface defect located within the blank and the method could provide that the blank be used as a non-structural body panel component.

The vehicle component may be a body component for a pickup truck. The aluminum blanks may be from a 6xxx series aluminum coil.

Another aspect of this disclosure is directed to a marking system for a metal coil. The marking system having a monitoring device configured to provide material property data of metal during rolling of the metal coil. The marking system having a marking device configured to provide a 2D-matrix containing the material property data on a surface of the coil. The marking system having a controller programmed to, in response to receiving the data, utilize the marking device to provide the 2D-matrix on the surface of the coil proximate a location of the data.

The marking device may be configured to provide the 2D-matrix along a longitudinal edge of the coil. The controller may be programmed to utilize the marking device to provide the 2D-matrix on the surface of the coil substantially transverse to the location of the data within the coil. The controller may also be programmed to utilize the marking device to provide the 2D-matrix at predefined intervals with the material property data contained in the 2D-matrix data being from within the predefined interval. The predefined interval may be 1.5 meters.

The 2D-matrix may be configured to be readable on a blank after blanking of the coil. The 2D-matrix may be configured to be readable on a stamped component after the stamping of the blank. The stamped component may be a vehicle body component.

The monitoring device may be a non-destructive testing device configured to measure the metal for surface and near-surface defects. The metal coil may be an aluminum alloy coil and the monitoring device may be configured to measure changes in percentages of alloying elements of an aluminum alloy during the rolling of the coil. The aluminum alloy may be a 6xxx series aluminum alloy.

A further aspect of this disclosure is directed to a body component for a vehicle. In this aspect, the body component is an aluminum alloy body component having a 2D-matrix marked on a surface of the component. The 2D-matrix containing material property data obtained during a formation of an aluminum coil that the component was blanked and subsequently formed from.

The material property data may be selected from a group consisting of a percentage of an alloying element, an aluminum series, and a temper designation. The material property data may include information about a near-surface defect location. The body component may be a 6xxx series aluminum body panel for a pickup truck.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
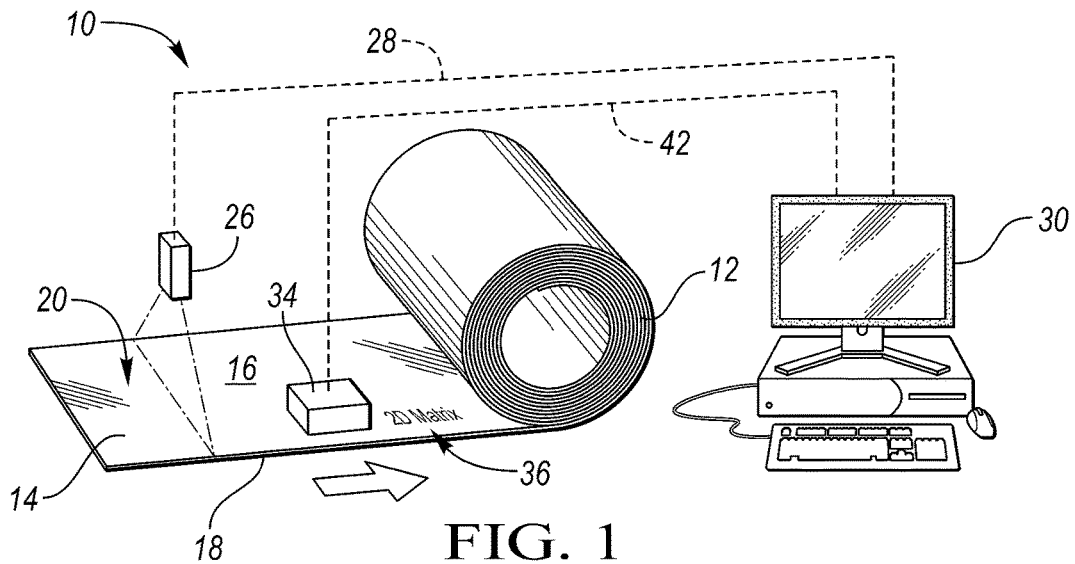
FIG. 1 is a diagrammatic view of a monitoring and marking system used on metal while being rolled into a coil.

FIG. 1 shows a marking system 10 for a metal coil 12. The metal coil 12 may be coiled from a rolled metal 14 having a surface 16 and a longitudinal edge 18. The metal 14 may contain a material property 20 created during the rolling of the metal 14. For example, a material property 20 may be a surface or near-surface defect. Material properties 20 may also include a percentage of an alloying element or changes in percentages of alloying elements of the metal 14 during the rolling of the coil 12. The material property 20 may have a location within metal 14 as indicated by arrow 20 designating the material property. Material properties 20 may change in the metal 14 from the beginning to the end of the coil 12.

The metal 14 may be an aluminum alloy and as such material properties could also include a percentage of a major alloying element in the aluminum alloy, an aluminum series, or a temper designation. The metal 14 may be a 6xxx series aluminum alloy. Changes in material properties 20 that may occur from a beginning of the coil 12 to the end of the coil 12 may impact the use of the metal 14 in future applications.

The system 10 may use a monitoring device 26 to monitor the metal 14 during formation of the metal coil 12. The monitoring device 26 is configured to monitor material properties 20 of the metal 14. The monitoring device 26 is also configured to provide material property data, as indicated by dashed lines 28, to a controller 30.

The monitoring device 26 is diagrammatically depicted as an optical scanning device, which it may be, however the monitoring device 26 may be any number of different devices capable of obtaining material properties 20 from a metal 14. For example, The monitoring device 26 may be a non-destructive testing device configured to measure the metal for surface and near-surface defects. Conversely, the monitoring device 26 may be configured to measure changes in percentages of alloying elements of an aluminum alloy during the rolling of the coil 12.

The system 10 has a marking device 34 configured to provide a 2D-matrix 36, on to the surface 16 of the metal 14. The 2D-matrix 36 may be an optically detectable marking 36. Conversely the 2D-matrix may only be readable by an electronic device and invisible to the naked eye. The 2D-matrix 36 may be marked by the marking device 34 along the longitudinal edge 18 of the metal 14, however the 2D-matrix 36 may be placed anywhere on the surface 16 of the metal 14. For example, in the case of the material property 20 being a near surface defect, the 2D-matrix 36 may be place on the surface 16 at the location of the defect.

The 2D-matrix 36 may be a barcode or a series of roman alpha-numeric characters. The 2D-matrix 36 may be configured to be readable on a blank 38 (see FIG. 3) after blanking of the coil 12. The 2D-matrix 36 may be configured to be readable on a stamped component 40 (see FIG. 5) after the stamping of the blank. The stamped component 40 may be a vehicle body component. The 2D-matrix 36 may be a light etching in the surface 16 of the metal 14. Conversely, the 2D-matrix 36 may be a thin ink applied to the surface 16 of the metal 14. In either case, the etching or ink may not substantially impact the thickness of the metal 14 or impact the coilability of the coil 12 which is why it is generally referred to as a 2D, or two dimensional, matrix.

The 2D-matrix 36 may contain material property data 28 about the material properties 20 measured by the monitoring device 26. The 2D-matrix 36 may also contain manufacturing data (not specifically shown but inherent in the manufacturing process). Examples of manufacturing data are an aluminum series, a temper designation, a date the coil 12 was formed, a position of the 2D matrix within the roll, and a supplier name. Manufacturing data, as used here, is generally data about the coil 12 that is consistent throughout the coil 12. Material property data 28, as used here, is generally data about the coil 12 that may change throughout the coil or be a property that may impact future manufacturability or final intended use of the metal 14, or portion of the metal 14 in which the material property 20 exists.

The controller 30 may be programmed to, in response to receiving the data 28, utilize the marking device 34, as indicated by dashed lines 42, to provide the 2D-matrix 36 on the surface 16 of the coil 12 proximate a location 20 of the material property. The controller 30 may be programmed to utilize the marking device 34 to provide the 2D-matrix 36 on the surface 16 of the coil 12 substantially transverse to the location of the material property 20 within the coil 12. The controller 30 may also be programmed to utilize the marking device 34 to provide the 2D-matrix at predefined intervals 46 (see FIG. 2). The 2D-matrix from one predefined interval 46 would contain material property data 28 of material properties 20 existing in the metal 14 from within the predefined interval 46.

Figure 2:
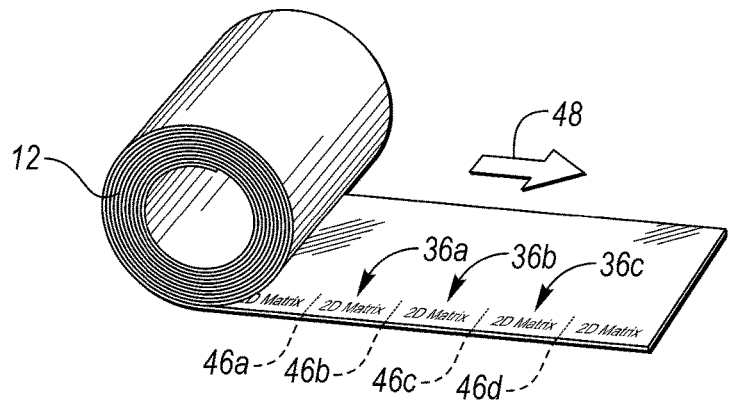
FIG. 2 is a diagrammatic view of a metal coil being unrolled showcasing a number of optically detectable markings along a longitudinal edge of the coil.

FIG. 2 showcases a metal coil 12 being uncoiled, as indicated by arrow 48. The metal coil 12 in this figure has 2D-matrices 36a, 36b, 36c within predetermined intervals 46a, 46b, 46c, 46d. Each 2D-matrix 36a, 36b, 36c contains material property data 28 about material properties 20 located within the predetermined intervals 46a, 46b, 46c, 46d. Stated more specifically, the material property data 28 from material properties 20 between interval lines 46a and 46b may be contained in 2D-matrix 36a. The predefined interval may be 1.5 meters.

Figure 3:
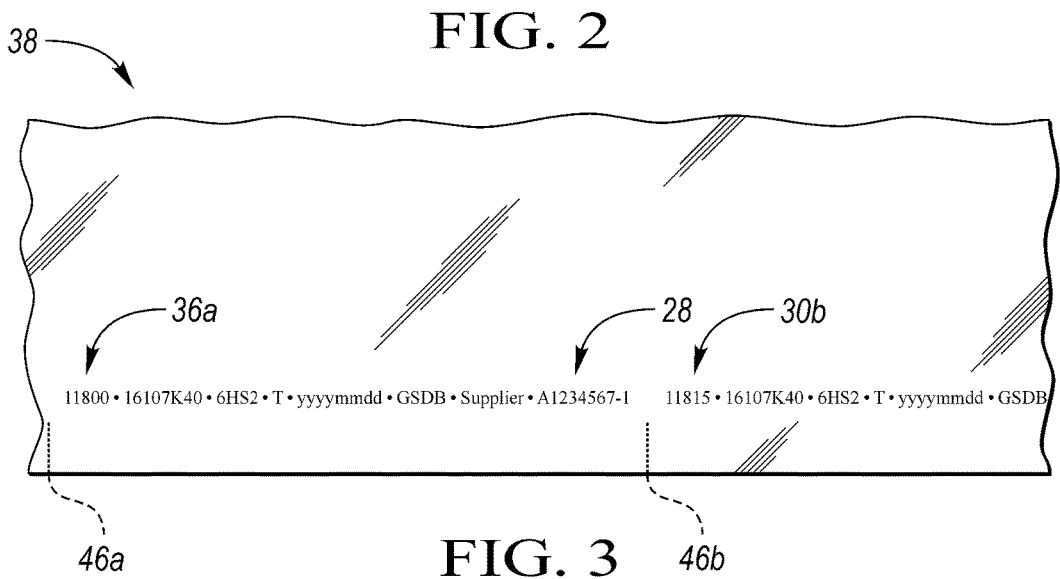
FIG. 3 is a partial view of an aluminum alloy sheet with an example of a 2D-matrix.

FIG. 3 is partial view of an aluminum alloy blank 38 with an example of 2D-matrices 36a, 36b. In this case, the 2D-matrices 36a, 36b are a series of roman alpha-numeric characters. The first set of alpha-numeric characters may indicate manufacturing data such as the position of the interval 46 from within the coil 12. The second set of alpha-numeric characters may indicate other manufacturing data such as an aluminum series and heat treatment. Additional sets of alpha-numeric characters may indicate other manufacturing data such as a date code or a manufacturer name or code.

Along with the manufacturing data may be material property data 28. The material property data 28 may be encoded with a key (not shown) provided to decode the data. The 2D-matrix 36a may contain data relating to a percentage of an alloying element or a near-surface defect existing between the intervals 46a, 46b.

Figure 4:
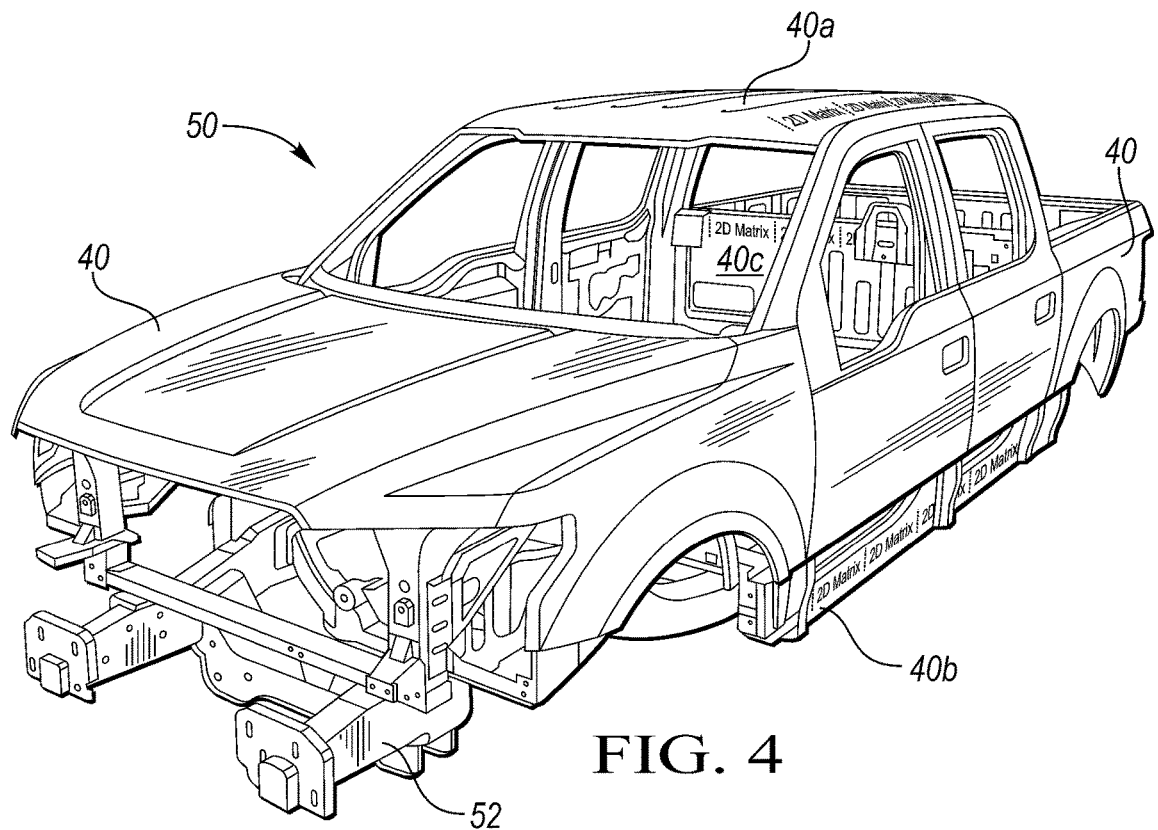
FIG. 4 is a perspective view of a pickup truck cab and box on a frame having vehicle components with optically visible 2D-matrices.
Figure 5:
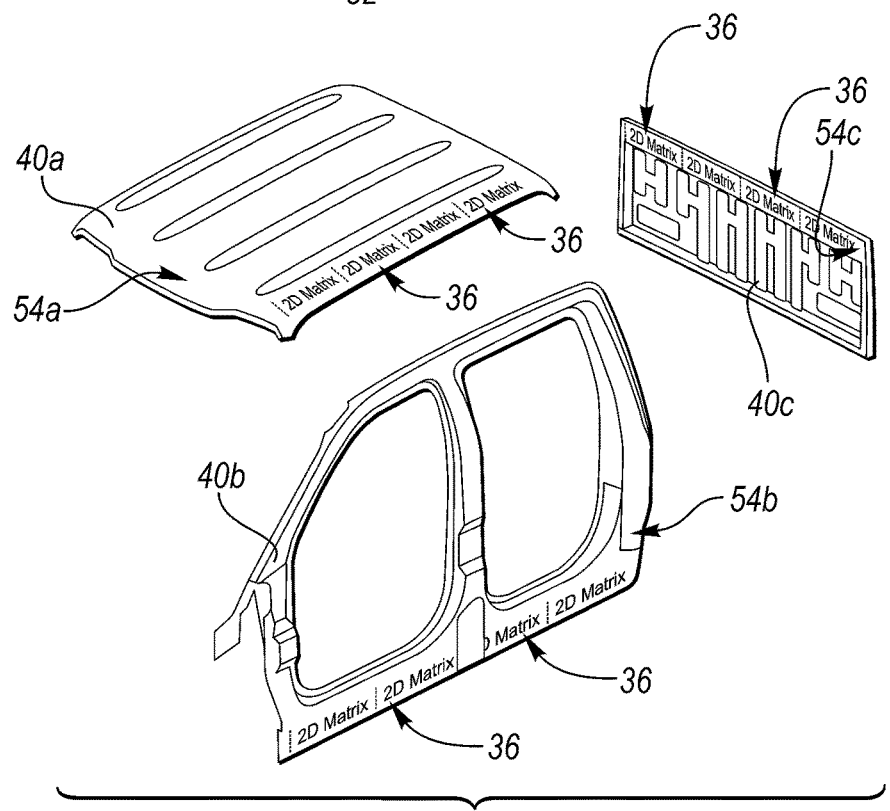
FIG. 5 is a partial exploded view of a select number of components from a pickup truck cab with optically visible 2D-matrices.

FIGS. 4 and 5 showcase body components 40 for a vehicle 50, specifically body components 40 for a pickup truck. The body components 40 are assembled together and mounted to a frame 52. In this case, a majority of the body components 40 are aluminum alloy body components 40. The frame 52 may be a steel frame 52. The aluminum alloy body components 40 may have been formed from blanks 38 (see FIG. 3) which originated from a coil 12 (see FIG. 1).

Body components 40 may be a roof panel 40a, a side member 40b extending downward from the roof panel 40a defining door openings, and a rear cab member 40c connecting left hand and right hand side members 40b to each other. The roof panel 40a, side member 40b, and rear cab member 40c may all be 6xxx series aluminum alloy.

In FIG. 5, each body component 40a, 40b, 40c has a surface 54a, 54b, 54c showing at least one 2D-matrix 36 that remains readable from when it was marked on the surface 16 of the aluminum when it was coiled. Similar to above, the 2D-matrices 36 contain material property data pertaining to material properties within the component 40a, 40b, 40c proximate the location of the material property. Although the 2D-matrices 36 are shown on the outer surfaces of the body components 40, they may be located on an inner surface of the body components 40.

As well, the 2D-matrices 36 are shown visible on components 40a, 40b, 40c in FIG. 4 for illustrative purposes, however in actual assembly process the body components 40a, 40b, 40c may be coated with an e-coat or paint when married to the frame 52, and the e-coat or paint may cover the 2D-matrices 36 making them unreadable. It is envisioned at the time of filing this application, however, that The 2D-matrices 36 need not be visible to the naked eye but still readable by an electronic device (not shown) even after processes such as e-coat and paint.

A final body component 40 may also not have any 2D-matrix 36 located on the component 40, as the section of the blank 38 that once contained the 2D-matrix 36 may have been trimmed off. This is especially useful in the scenario where the 2D-matrix 36 is a near-surface defect, the 2D-matrix 36 is readable by an electronic device, the body component 40 is intelligently formed and trimmed to cut off the near-surface defect, and any body component or even the final vehicle assembly may be examined for any remaining 2D-matrices having data pertaining to near-surface defects, and finding none, knowing that the vehicle 50 is defect free, while still being able to use the blank 38 in the manufacturing process.

As with above, the material property data encoded in each 2D-matrix 36 may include percentage of an alloying element in that component, an aluminum series, a temper designation, however each 2D-matrix 36 need not be limited to this data nor is every 2D-matrix 36 required to contain such data. A 2D-matrix 36 may also include manufacturing data such as, but not limited to, an aluminum series, a temper designation, a date, a position of the 2D matrix within the roll, and a supplier name.

The above system and components may provide for a method of allocating aluminum blanks 38 cut from a coil 12 having optically detectable markings. The markings may be 2D-matrices 36. The aluminum blanks 38 may be from a 6xxx series aluminum coil 12.

The method comprises a step of reading at least one marking 36 on a blank 38. The marking may contain data relating to material properties 20 originating from within a region of the coil proximate the marking 36. The method may include decoding data encoded in the marking 36. The method may also include allocating the blank 38, in response to the decoded data, for production of a plurality of vehicle components 40.

A predefined data map (not shown) having at least one material property limit may be provided. The material property of concern may be a non-visible-to-the-naked-eye surface defect located within the region of the blank 38 proximate the marking 36. The material property limit may be an occurrence of any surface defects within the region of the blank 38. The step of allocating the blank 38 in response to the decoded data may include allocating the blank 38 for a first vehicle component, such as side member 40b, in response to the decoded data containing a material property below the material property limit. The step of allocating the blank 38 in response to the decoded data may include allocating the blank 38 for a second vehicle component, such as a roof panel 40a, in response to the decoded data containing a material property above the material property limit.

The first vehicle component 40b may be a structural body component where a near-surface defect may not be acceptable. The second vehicle component 40a may be a non-structural body panel component where a near-surface defect may not have any impact on the fit, finish, or use of the body component. Allocation of blanks 38 to be used for differing body components 40 provides an opportunity to know what material properties are in each blank 38 and provides for a better allocation of the blanks 38 depending on which body component 40 the blank is intended to be formed into. This method may also provide information that provides for a blank 38 to not be used at all, improving the overall safety of the vehicle 50. This method may also provide for a blank 38 to be aligned in a stamping operation such that a defect may be trimmed off allowing for use of a blank 38 that may have previously been scrapped.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A method of allocating aluminum blanks cut from a coil having optically detectable markings comprising:
    reading at least one marking on a blank;
    decoding data encoded in the marking; and
    allocating the blank, in response to the decoded data, for production of a plurality of vehicle components.

2. The method of claim 1 wherein the markings contain data relating to material properties originating from within a region of the coil proximate the marking.

3. The method of claim 2 further comprising:
    providing a predefined data map having at least one material property limit; and
    allocating the blank for a first vehicle component in response to the decoded data containing a material property below the material property limit and for a second vehicle component in response to the decoded data containing a material property above the material property limit.

4. The method of claim 3 wherein the material property is a non-visible-to-the-naked-eye surface defect located within the region of the coil proximate the marking, the material property limit is an occurrence of any surface defects, the first vehicle component being a structural body component, the second vehicle component being a non-structural body panel component, and the step of utilizing the blank provides for the use of the blank as a non-structural body panel component.

5. The method of claim 1 wherein the vehicle component is a body component for a pickup truck.

6. The method of claim 1 wherein the aluminum blanks are from a 6xxx series aluminum coil.

7. A marking system for a metal coil comprising:
    a monitoring device configured to provide material property data of metal during formation of a coil;
    a marking device configured to provide a 2D-matrix on a surface of the coil; and
    a controller programmed to, in response to receiving the data, utilize the marking device to provide the 2D-matrix containing the material property data on the coil proximate a location of the material property, wherein the portion of the coil proximate to the location of the material property is allocated for production of at least one of a plurality of vehicle body components based on the material property data.

8. The marking system of claim 7 wherein the marking device is configured to provide the 2D-matrix along a longitudinal edge of the coil, and the controller is programmed to utilize the marking device to provide the 2D-matrix on the surface of the coil substantially transverse to the location of the material property within the coil.

9. The marking system of claim 7 wherein the controller is programmed to utilize the marking device to provide the 2D-matrix at predefined intervals, and wherein the material property data contained in the 2D-matrix is data from within that interval.

10. The marking system of claim 9 wherein the predefined intervals are every 1.5 meters.

11. The marking system of claim 7 wherein the 2D-matrix is configured to be readable on a blank after blanking of the coil.

12. The marking system of claim 11 wherein the 2D-matrix is configured to be readable on a stamped component after the stamping of the blank.

13. The marking system of claim 12 wherein the stamped component is a vehicle body component.

14. The marking system of claim 7 wherein the monitoring device is a non-destructive testing device configured to measure the metal for surface and near-surface defects.

15. The marking system of claim 7 wherein the metal coil is an aluminum alloy coil and the monitoring device is configured to measure changes in percentages of alloying elements of an aluminum alloy during rolling of the coil.

16. The marking system of claim 7 wherein the metal is a 6xxx series aluminum alloy.

17. A body component for a vehicle comprising:
    an aluminum alloy body component having a 2D-matrix marked on a surface of the component containing material property data obtained during a formation of an aluminum coil that the component was blanked and subsequently formed from, wherein the body component is one of a plurality of vehicle body components based on the material property data.

18. The body component of claim 17 wherein the material property data selected from a group consisting of a percentage of an alloying element, an aluminum series, and a temper designation.

19. The body component of claim 17 wherein the material property data includes information about a near-surface defect location.

20. The body component of claim 17 wherein the body component is a 6xxx series aluminum body panel for a pickup truck.

* * * * *